Dec. 27, 1955    C. E. BENDER    2,728,459
FILTRATION APPARATUS
Filed May 18, 1953
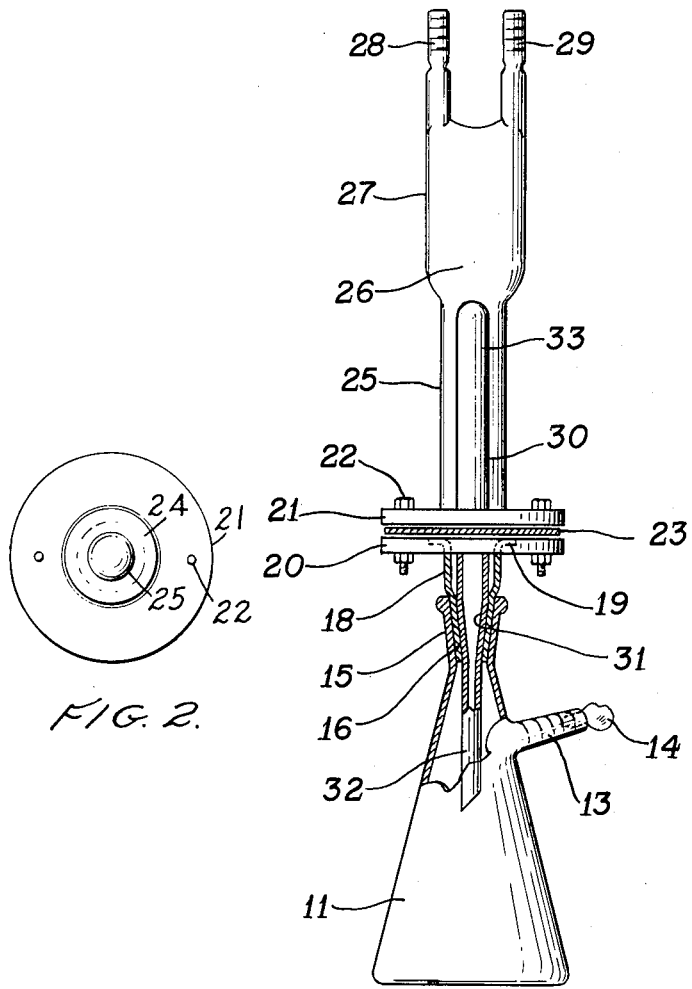
FIG. 2.
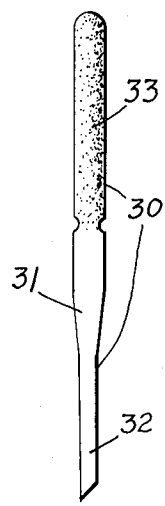
FIG. 3.
FIG. 1.
INVENTOR
Charles E. Bender
BY
ATTORNEY 2,728,459

FILTRATION APPARATUS

Charles E. Bender, Yonkers, N. Y., assignor to Virtis Company, Inc., Yonkers, N. Y., a corporation of New York Application May 18, 1953, Serial No. 355,828

1 Claim. (Cl. 210—155)

The present invention relates to a filtration apparatus, intended particularly for bacteriological and ultrafiltration work.

In the preparation of either bacteria free liquids or ultrafiltrates, relatively large volumes of liquid must be forced through filter media of extremely small pore size in the first case, or through permeable membranes, such as cellophane or collodion membranes in the second case. In most instances, the work must be accomplished under sterile conditions. In the past, filtration devices of this type have been often made from metal, such as brass, primarily to withstand the relatively high pressures which were believed necessary to obtain an adequate filtration rate. Such devices were rather bulky and difficult to assemble. They could not be autoclaved as a whole unit and, being of metal, they did not permit observation of flow and progress of filtration.

After it had been found that high pressure was unnecessary and that the rate of filtration, particularly in ultrafiltration, was much better at low pressure whereby less blocking occurs, workers in the field returned to glass as the material for filtration devices of this type. However, all such devices of which I am aware have one disadvantage or another. Some of them are bulky and cannot be sterilized as a unit, others are difficult to assemble and to keep sterile during operation, still others have a filtration rate which is too slow except for very small quantities of filtrate, and so forth.

I have now devised an all glass bacteriological filter which is readily adaptable for use as an ultrafilter of large volume output. The apparatus has the further advantage that it can be sterilized as a unit in the autoclave and that, in case of breakage, all parts are easily replaceable. The unit is readily assembled and taken apart for cleaning. It can be used with either pressure or vacuum. Being made from glass, the device permits a ready observation of the filtration and of the condition of the filter element.

The invention is illustrated in the accompanying drawing, Fig. 1 showing an elevation, partly in sectional view, of the preferred construction of the device. Fig. 2 showing the manner of connection between two parts of the device and Fig. 3 presenting another part in elevation.

Referring in more detail to the drawing, there is shown a filtration flask 11 of usual shape which constitutes the reservoir for filtered material. This flask is provided with a lateral connection 13 for attaching an evacuation tube thereto if the filtration is to be carried out by means of vacuum. During pressure filtration, the opening of this connecting tube is closed, as shown, by means of a sterile cotton plug 14. The neck portion 15 of the said flask is provided with a ground interior surface in order to fit the larger of two interjoints 16 and 31. The interjoint 16, having ground exterior and interior surfaces, carries a short, substantially cylindrical part 18 extending from the flask, which terminates in a crimp or shoulder 19, made by the glass blower to fit into the recess of a flange 20 after slipping the flange over the said cylindrical part. As shown more particularly in Fig. 2, by means of a crimp 24 a similar flange 21 is fitted in a like manner over the constricted cylindrical part 25 of a mantle 26 which then extends into a wider cylindrical part 27 and terminates in two short connecting tubes 28 and 29, one of which serves as the feed inlet by attaching, say, a length of rubber tubing with a pinch cock and a funnel to it, while the other is employed as the pressure inlet if the apparatus is to be used for pressure filtration.

Prior to attaching the mantle to the flask, the filtration element 30, shown in full in Fig. 3, is inserted into the neck of the flask. This filtration element consists of the aforementioned interjoint 31, from which a short length of glass tubing 32 extends downward into the interior of the flask. Fitted to this interjoint is also the filtering element 33, preferably consisting of a fritted glass or ceramic candle. Candles of this type are available at different lengths and with various grades of porosity suitable for specific filtration requirements. By a judicious selection of the length, diameter and porosity of the filter candle on the one hand, and of the inside diameter of the constricted mantle section 25 on the other hand, a proportionally large filter area can be provided for a substantially small amount of liquid to be filtered. Conversely, notwithstanding the small space between the candle and the surrounding mantle section, relatively large amounts of liquid can be handled at once because of the enlargement of the mantle at 27.

Having inserted the filter element, the aforementioned mantle is put in position by placing the flanges face to face. The flanges are fastened to each other by means of a plurality of bolts and nuts such as the bolt and nut shown at 22. The flanges may be of any suitable shape, say of triangular shape, in which case they will accommodate three bolts, spaced 120° from each other. In order to provide an air-tight closure, a gasket 23 is fitted between the flanges. Polytetrafluoro ethylene (Teflon), plasticized vinyl chloride polymer (Tygon) or rubber are some of the preferred materials for the gasket.

The device of the foregoing description is an improved bacteriological filter. In the adaptation of this unit for ultrafiltration removing not only bacteria but certain colloidal materials as well, the filter candle 30 provides a most suitable backing for the necessary gelatine or collodion film. The filter candle can be coated very readily by dipping it into a solution of the film forming material and thus furnishes a film-supporting base which is superior to previously used perforated metal plates and the like. The coated filter candle offers a relatively large filtration area without the danger of film shrinkage and breakage which is a continuous source of annoyance with large size flat filtration media of this type.

Having described my invention, I claim:

As a filtration device, the combination of a flask having an internally ground neck and a connecting tube extending laterally from the wall, an interjoint fitting into the said neck and extending therefrom a crimped, substantially cylindrical connecting part, a first flange fitting the said interjoint below the crimp, a mantle consisting of a lower constricted cylindrical portion having a crimp at the free end and an expanded upper cylindrical portion having a closure on top and two small size tubes extending from the said closure, a second flange fitting the said constricted cylindrical portion above the crimp and placed onto the said first flange with a gasket fitted therebetween to produce an airtight closure, means for fastening the two flanges to each other, and a cylindrical filter element which is closed on top and, being concentrically spaced within the said constricted part of the mantle, is mounted on a second interjoint fitting within the said first interjoint and extends a length of tube into the said flask.

References Cited in the file of this patent

UNITED STATES PATENTS

| | | |
|---|---|---|
| 2,016,161 | Wilderman | Oct. 1, 1935 |
| 2,202,055 | Juffa | May 28, 1940 |
| 2,211,892 | Giese | Aug. 20, 1940 |
| 2,376,739 | Walker | May 22, 1945 |
| 2,449,238 | Lightfoot, Jr. | Sept. 14, 1948 |